(12) United States Patent
Custodero et al.

(10) Patent No.: US 8,646,500 B2
(45) Date of Patent: Feb. 11, 2014

(54) MULTILAYERED GAS-TIGHT AND ANTI-PUNCTURE LAMINATE OBJECT INCLUDING SAME

(75) Inventors: Emmanuel Custodero, Chamalieres (FR); Pierre Lesage, Clermont-Ferrand (FR); José Merino Lopez, Riom (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 615 days.

(21) Appl. No.: 12/663,685

(22) PCT Filed: May 20, 2008

(86) PCT No.: PCT/EP2008/004028
§ 371 (c)(1),
(2), (4) Date: Jun. 7, 2010

(87) PCT Pub. No.: WO2008/154996
PCT Pub. Date: Dec. 24, 2008

(65) Prior Publication Data
US 2010/0294411 A1 Nov. 25, 2010

(30) Foreign Application Priority Data
Jun. 8, 2007 (FR) .................................... 07 04126

(51) Int. Cl.
*B60C 5/14* (2006.01)
*B60C 19/12* (2006.01)

(52) U.S. Cl.
USPC ........... 152/502; 152/503; 152/504; 152/510; 523/166

(58) Field of Classification Search
USPC .......................... 152/502–507, 510; 523/166
See application file for complete search history.

(56) References Cited

U.S. PATENT DOCUMENTS

| | | | |
|---|---|---|---|
| 4,113,799 A | 9/1978 | Van Ornum et al. | |
| 4,228,839 A | 10/1980 | Bohm et al. | |
| 4,426,468 A | 1/1984 | Ornum et al. | |
| 4,895,610 A | 1/1990 | Egan | |
| 4,913,209 A | 4/1990 | Hong et al. | |

(Continued)

FOREIGN PATENT DOCUMENTS

| | | |
|---|---|---|
| EP | 0 264 506 | 4/1988 |
| EP | 1 433 830 | 6/2004 |

(Continued)

OTHER PUBLICATIONS

Kirk-Othmer Encyclopedia of Chemical Technology: Thermoplastic Elastomers, 2002.*

(Continued)

*Primary Examiner* — Justin Fischer
*Assistant Examiner* — Robert Dye
(74) *Attorney, Agent, or Firm* — Cozen O'Connor

(57) ABSTRACT

A puncture-resistant multilayer laminate that is impermeable to inflation gases, comprising: a gastight first elastomer layer comprising a polystyrene/polyisobutylene block copolymer thermoplastic elastomer, and optionally an extender oil with a content within a range of 0 to less than 100 phr; and a self-sealing second elastomer layer comprising a thermoplastic styrene elastomer, identical to or different from the first elastomer, and an extender oil with a content greater than 200 phr.

24 Claims, 1 Drawing Sheet

(56) References Cited

U.S. PATENT DOCUMENTS

| | | | |
|---|---|---|---|
| 6,191,197 B1 | 2/2001 | Wang et al. | |
| 6,334,919 B1 * | 1/2002 | Takeyama et al. | 156/123 |
| 7,954,528 B2 * | 6/2011 | Tsou et al. | 152/510 |
| 2006/0052535 A1 * | 3/2006 | Ajbani et al. | 525/88 |

FOREIGN PATENT DOCUMENTS

| | | | |
|---|---|---|---|
| JP | 47-26433 | | 10/1972 |
| JP | 2001279051 | | 10/2001 |
| JP | 2002161186 | | 6/2002 |
| JP | 2003-192867 | * | 7/2003 |
| WO | WO99/62998 | * | 12/1999 |
| WO | WO 03/028986 | | 4/2003 |
| WO | WO2006/047509 | * | 5/2006 |
| WO | WO 2007/044104 | | 4/2007 |

OTHER PUBLICATIONS

Kraton Polymers. Typical Properties Guide. http://www.univareurope.com/uploads/documents/uk/Kraton_Brochure01.pdf. Apr. 2001.*

English machine translation of JP2003-192867. Jul. 2002.*

* cited by examiner

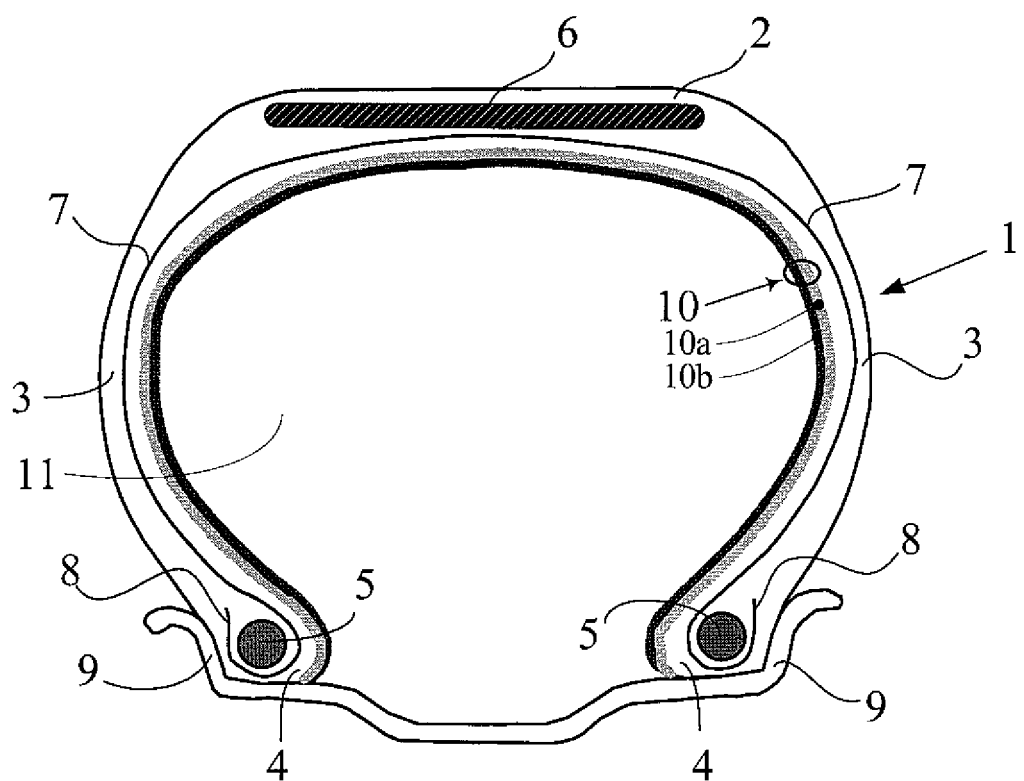

MULTILAYERED GAS-TIGHT AND ANTI-PUNCTURE LAMINATE OBJECT INCLUDING SAME

RELATED APPLICATIONS

This is a U.S. national stage under 35 USC §371 of application No. PCT/EP2008/004028, filed on May 20, 2008.

This application claims the priority of French application Ser. No. 07/04126 filed Jun. 8, 2007, the entire content of which is hereby incorporated by reference.

FIELD OF THE INVENTION

The present invention relates to layers that are impermeable to inflation gases and also to self-sealing puncture-resistant layers intended for sealing off any holes due to perforations in service, and also to the use of such layers in inflatable articles.

The invention relates more particularly to the multilayer laminates that fulfil the above two functions, airtightness and puncture-resistance, intended in particular for pneumatic tires or inner tubes.

BACKGROUND OF THE INVENTION

In a conventional pneumatic tire of the "tubeless" type (that is to say of the type without an inner tube), the radially internal face comprises an airtight layer (or more generally a layer that is impermeable to any inflation gas) which enables the pneumatic tire to be inflated and kept under pressure. Its airtightness properties enable it to guarantee a relatively low rate of pressure loss, making it possible to keep the tire inflated, in the normal operating state, for a sufficient time, normally several weeks or several months. It also has the role of protecting the carcass reinforcement from diffusion of air coming from the internal space of the tire.

This role of airtight inner layer or "inner liner" is today essentially fulfilled by compositions based on an elastomer or butyl rubber, long renowned for their excellent airtightness properties.

Moreover, in recent years, tire manufacturers have made particularly strenuous efforts to develop novel ways of solving a problem dating back from the very start of the use of wheels fitted with inflated tires, namely how to allow a vehicle to continue to travel despite a substantial or total loss of pressure of one or more tires. For decades, the spare wheel was considered to be the only and universal solution. Then, more recently, the considerable advantages of possibly dispensing with the spare tire have appeared. The concept of "extended mobility" was developed. The associated techniques allow the vehicle to run with the same tire, dependent on certain limitations to be respected, after a puncture or a pressure drop. This makes it possible for example to get to a point of repair without having to stop, often in hazardous circumstances, to fit the spare wheel.

Self-sealing compositions that can achieve such an objective, which by definition are capable automatically, i.e. without any external intervention, of sealing a tire in the event of it being punctured by a foreign body, such as a nail, are among the technical solutions which were studied. They are particularly difficult to develop, having to satisfy many conditions of a physical and chemical nature. They must in particular be effective over a very wide operating temperature range and over the entire lifetime of the tires.

This puncture-resistance role is fulfilled by self-sealing compositions which are themselves also usually based on butyl rubber. As examples, U.S. Pat. No. 4,113,799 (or FR 2 318 042) describes, as self-sealing layer, a composition comprising a combination of partially crosslinked butyl rubbers of high and low molecular weights, possibly in the presence of a small portion of a thermoplastic styrene elastomer. U.S. Pat. No. 4,228,839 has proposed a rubber compound containing a first polymer material that degrades when irradiated, such as polyisobutylene, and a second polymer material that crosslinks when irradiated, preferably a butyl rubber. U.S. Pat. No. 4,426,468 has also proposed a self-sealing composition based on crosslinked butyl rubber of very high molecular weight.

A known drawback of butyl rubbers is that they suffer large hysteresis losses, furthermore over a wide temperature range, which drawback has repercussions on the layers or compositions themselves, whether they are of gastight type or of the self-sealing type, giving them a large increase in hysteresis and considerably degrading the rolling resistance of tires using such compositions.

SUMMARY OF THE INVENTION

One object of the present invention is to reduce the hysteresis of gastight and self-sealing multilayer laminates, and therefore in fine the fuel consumption of motor vehicles.

The Applicants have now discovered, during their research, that elastomer layers other than layers based on butyl elastomer make it possible to obtain laminates that meet such an objective, while offering the latter excellent airtightness and puncture-resistance properties.

One aspect of the present invention relates to a puncture-resistant multilayer laminate that is impermeable to inflation gases that can be used in an inflatable article, comprising:
  a gastight first elastomer layer comprising a thermoplastic elastomer copolymer with polystyrene and polyisobutylene blocks (hereinafter "first elastomer"), and optionally an extender oil with a content within a range of 0 to less than 100 phr; and
  a self-sealing second elastomer layer comprising a thermoplastic styrene elastomer (hereinafter "second elastomer"), identical to or different from the first elastomer, and an extender oil with a content greater than 200 phr.

Compared to butyl rubbers, such elastomers have the major advantage, due to their thermoplastic nature, of being able to work as is in the molten (liquid) state, and consequently of offering a possibility of simplified processing.

The use of a very high extender oil content in the second elastomer layer has proved to offer self-sealing properties that are substantially improved relative to the solutions from the prior art, whilst the preferential use of a small amount of extender oil in the first elastomer layer can promote the integration of the multilayer laminate in the inflatable article, by virtue of an increase in the tackifying power and a reduction of the modulus and of the gastight first layer, without unacceptable degradation of its airtightness.

Another aspect of the invention relates to the use of the above multilayer laminate in an inflatable article such as a pneumatic tire or an inner tube, particularly when said laminate is placed on the inner wall of said inflatable article or pneumatic tire.

Another aspect of the invention relates to the use, for the manufacture of a puncture-resistant multilayer laminate that is impermeable to inflation gases, of at least a gastight first elastomer layer and a self-sealing second elastomer layer as defined above.

Another aspect of the invention relates to a method for sealing an inflatable article against gases and protecting it from punctures, in which a multilayer laminate according to the invention is incorporated into said inflatable article during its manufacture or is added to said inflatable article after its manufacture.

The multilayer laminate according to an embodiment of the invention can be used in any type of "inflatable" article, that is to say, by definition, any article that assumes its usable shape when it is inflated with air. As examples of such inflatable articles, mention may be made of inflatable boats, balloons or balls used for games or sports, pneumatic tires, and inner tubes.

Another aspect of the invention relates to any inflatable article comprising a multilayer laminate according to the invention, said inflatable article being, in particular, an inner tube, especially an inner tube for a pneumatic tire, or else a rubber article such as a pneumatic tire.

One aspect of the invention relates more particularly to pneumatic tires intended to be fitted on motor vehicles of the passenger type, SUV ("Sport Utility Vehicle") type, two-wheel vehicles (especially motor cycles), aircraft, industrial vehicles chosen from vans, heavy vehicles—i.e. underground trains, buses, road transport vehicles (lorries, towing vehicles, trailers), off-road vehicles such as agricultural and civil-engineering vehicles—, and other transport or handling vehicles.

BRIEF DESCRIPTION OF THE SINGLE DRAWING

The single FIGURE shows schematically, in radial cross section, a pneumatic tire according to an embodiment of the invention.

I. Detailed Description of the Single Drawing

In the present description, unless otherwise indicated, all the percentages (%) indicated are % by weight.

Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

I-1. Multilayer Laminate

The multilayer laminate of the invention therefore has the main feature of comprising at least:
  a gastight first elastomer layer which comprises a thermoplastic elastomer copolymer with polystyrene and polyisobutylene blocks (known as "first elastomer" in the present application), and optionally an extender oil with a content within a range of 0 to less than 100 phr (parts by weight per hundred parts of the first elastomer or of the total of the elastomer(s) present in the first layer); and
  a self-sealing second elastomer layer which comprises a thermoplastic styrene elastomer (known as "second elastomer" in the present application), which is identical to or different from the first elastomer, and an extender oil with a content of greater than 200 phr (parts by weight per hundred parts of the second elastomer or of the total of the elastomer(s) present in the second layer).

The two layers therefore each comprise an elastomer which is of the thermoplastic styrene type.

Of course, the invention applies to multilayer laminates comprising more than two layers, namely the gastight first layer and the self-sealing second layer as described in detail below. The invention applies, for example, to the case where, interposed between the two preceding layers, is at least a third layer, having for example a role of buffer or of film that is impermeable to the extender oils present in said first and second layers.

I-1-A. Thermoplastic Styrene Elastomers

It will firstly be recalled here that thermoplastic styrene (TPS) elastomers are part, in a known manner, of the family of thermoplastic elastomers (TPEs). Having a structure intermediate between thermoplastic polymers and elastomers, they are composed of hard polystyrene blocks linked by flexible elastomer blocks, for example polybutadiene, polyisoprene, poly(ethylene-butylene) or else polyisobutylene blocks. They are often triblock elastomers with two hard segments linked by a flexible segment. The hard and flexible segments may be in a linear, star or branched configuration. Typically, each of these segments or blocks contains at least more than 5, generally more than 10 base units (for example styrene units and isoprene units for a styrene/isoprene/styrene block copolymer).

The expression "thermoplastic elastomer copolymer with polystyrene and polyisobutylene blocks" (or "first elastomer"), should be understood to mean any thermoplastic copolymer comprising at least one polystyrene block (that is to say one or more polystyrene blocks) and at least one polyisobutylene block (that is to say one or more polyisobutylene blocks), with which other blocks (for example polyethylene and/or polypropylene blocks) and/or other monomer units (for example unsaturated units such as diene units) may or may not be associated.

Preferably, the first elastomer is a styrene/isobutylene/styrene (SIBS) triblock copolymer. The expression "SIBS elastomer or copolymer" is understood in the present application, by definition, to mean any styrene/isobutylene/styrene triblock elastomer in which the central polyisobutylene block may or may not be interrupted by one or more unsaturated units, in particular one or more diene units such as isoprene units, which are optionally halogenated, and also any mixture or blend of elastomers corresponding to this definition.

Preferably, the first elastomer, especially SIBS, is the sole elastomer, or the predominant elastomer by weight, present in the first elastomer layer.

If optional other additional elastomers are used in this first elastomer layer, the first elastomer more preferably represents more than 50%, more preferably still more than 70% by weight of all of the elastomers present in this layer or composition. Such additional elastomers that are preferably in the minority by weight, could be for example diene elastomers such as natural rubber or a synthetic polyisoprene, a butyl rubber or else TPS elastomers of a different nature, within the limit of the compatibility of their microstructures.

However, according to one preferred embodiment, the first elastomer, especially SIBS, is the sole elastomer, and the sole thermoplastic elastomer present in the first (gastight) elastomer layer.

SIBS elastomers for example are commercially available, sold for example by KANEKA under the name "SIBSTAR" (e.g. "Sibstar 102T", "Sibstar 103T" or "Sibstar 073T"). They have, for example, been described, and also their synthesis, in patent documents EP 731 112, U.S. Pat. No. 4,946,899 and U.S. Pat. No. 5,260,383. They were firstly developed for biomedical applications, then described in various applications specific to TPE elastomers, as varied as medical equipment, motor vehicle parts or parts for electrical goods, sheaths for electrical wires, sealing or elastic parts (see, for example, EP 1 431 343, EP 1 561 783, EP 1 566 405 and WO 2005/103146).

The second elastomer is any TPS elastomer. It may especially be chosen from the group consisting of styrene/butadiene/styrene block copolymers, styrene/isoprene/styrene block copolymers, styrene/isobutylene/styrene block copolymers, styrene/isoprene/butadiene/styrene block copolymers, styrene/ethylene-butylene/styrene block copolymers, styrene/ethylene-propylene/styrene block copolymers, styrene/ethylene-ethylene-propylene/styrene block copolymers and mixtures of these copolymers.

More preferably, the second elastomer is chosen from the group consisting of styrene/ethylene-butylene/styrene (SEBS) block copolymers, styrene/ethylene-propylene/styrene (SEPS) block copolymers, and mixtures of these copolymers.

Preferably, the second elastomer, especially SEBS or SEPS, is the sole elastomer, or the predominant elastomer by weight, present in the second elastomer layer.

If optional other additional elastomers are used in this second layer, the second elastomer represents more preferably more than 50%, more preferably still more than 70% by weight of all the elastomers present in this layer. As before for the first layer, such additional elastomers, preferably in the minority by weight, could be for example diene elastomers such as natural rubber or a synthetic polyisoprene, a butyl rubber or else TPS elastomers of a different nature, within the limit of the compatibility of their microstructures.

However, according to one particularly preferred embodiment, the second elastomer is the sole elastomer, and the sole thermoplastic elastomer present in the second (self-sealing composition) elastomer layer.

TPS elastomers, such as for example SEPS or SEBS, extended with high levels of oils are well known and commercially available in the extended form. As examples, mention may be made of the products sold by Vita Thermoplastic Elastomers or VTC ("VTC TPE group") under the name "Dryflex" (e.g. "Dryflex 967100") or "Mediprene" (e.g. "Mediprene 500 000M"), and those sold by Multibase under the name "Multiflex" (e.g. "Multiflex G00").

These products, developed in particular for medical, pharmaceutical or cosmetic applications, may be processed conventionally in respect of TPEs by extrusion or moulding, for example starting from a raw material available in bead or granule form. Completely surprisingly, they have proved to be capable, after a possible adjustment of their extender oil content within the range recommended by the present invention (greater than 200 phr, preferably between 200 and 700 phr), of fulfilling the function of an effective self-sealing composition.

According to one preferred embodiment of the invention, the weight content of styrene, in each of the first elastomer and second elastomer, is between 5% and 50%. Below the indicated minimum, the thermoplastic nature of the elastomer runs the risk of being substantially reduced, whereas above the recommended maximum the elasticity of the layers may be adversely affected. For these reasons, the styrene content is more preferably between 10 and 40%, in particular between 15 and 35%.

The term should be understood in the present description as meaning any monomer based on unsubstituted or substituted styrene; among the substituted styrenes mention may be made, for example, of methylstyrenes (for example, α-methylstyrene, β-methylstyrene, p-methylstyrene, tert-butylstyrene), chlorostyrene (for example monochlorostyrene, dichlorostyrene).

It is preferable for the glass transition temperature ($T_g$, measured according to ASTM D3418) of the two elastomers to be below −20° C., more preferably below −40° C. A $T_g$ value above these minimum temperatures may reduce the performance when used at a very low temperature; for such a use, the $T_g$ of the two elastomers is more preferably still below −50° C.

The number-average molecular weight ($M_n$) of the thermoplastic styrene elastomers is determined in a known manner by size exclusion chromatography (SEC). The specimen is first dissolved in tetrahydrofuran with a concentration of about 1 g/l; then the solution is filtered on a filter of 0.45 .mu.m porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series having the trade names STYRAGEL (HMW7, HMW6E and two HT6E) is used. The injected volume of the polymer specimen solution is 100 µl. The detector is a WATERS 2410 differential refractometer and its associated software for handling the chromatographic data is the WATERS MILLENNIUM system. The calculated average molecular weights are relative to a calibration curve obtained with polystyrene standards.

The number-average molecular weight (denoted by $M_n$) of the first elastomer is preferably between 30 000 and 500 000 g/mol, more preferably between 40 000 and 400 000 g/mol. Below the minimum values indicated, the cohesion between the elastomer chains especially due to the optional dilution of the latter (in the presence of an extender oil), runs the risk of being adversely affected; moreover, an increase in the usage temperature runs the risk of adversely affecting the mechanical properties, especially the properties at break, consequently leading to reduced "hot" performance. Moreover, too high a molecular weight $M_n$ may be detrimental as regards the flexibility of the gastight layer. Thus, it has been observed that a value lying within a range of 50 000 to 300 000 g/mol was particularly suitable, especially for use in a pneumatic tire.

For the same reasons as those set out above, the molecular weight $M_n$ of the second elastomer is preferably between 50 000 and 500 000 g/mol, more preferably between 75 000 and 450 000 g/mol; a molecular weight $M_n$ within a range of 250 000 to 400 000 has proved particularly suitable for use in a pneumatic tire.

The polydispersity index $I_p$ (N.B.: $I_p = M_w/M_n$ where $M_w$ is the weight-average molecular weight) of the first elastomer and second elastomer is preferably less than 3, more preferably $I_p$ is less than 2.

I-1-B. Extender Oils

The first elastomer, such as SIBS, is sufficient by itself for the function of impermeability to gases with respect to the inflatable articles in which it is used to be fulfilled.

However, according to one preferred embodiment of the invention, the latter is used in a composition which also comprises, as a plasticizing agent, an extender oil (or plasticizing oil), the role of which is to facilitate the processing, particularly the integration into the inflatable article via a reduction of the modulus and an increase of the tackifying power of the gastight layer, at the expense of an acceptable loss in permeability.

It is preferred that the extender oil content in the first elastomer layer is greater than 5 phr, that is to say, in other words, between 5 and 100 phr. Below the indicated minimum, the first layer runs the risk of having too high a rigidity to certain applications, whereas above the recommended maximum there is a risk of the composition having insufficient cohesion and of loss of impermeability. For these reasons, in particular for use in a pneumatic tire, the extender oil content is more preferably greater than 10 phr (especially between 10 and 90 phr), more preferably still greater than 20 phr (especially between 20 and 80 phr).

Unlike the first elastomer layer, the second elastomer layer itself requires the presence of a very high extender oil content, of greater than 200 phr. By virtue of this very high extender oil content, the self-sealing second elastomer layer has proved, compared to the usual self-sealing compositions, to very substantially improve the rate of sealing of a hole in the inflatable article during the delayed removal of a puncturing object.

It is preferred that the extender oil content is between 200 and 700 phr. For use in a pneumatic tire, the extender oil content is more preferably between 250 and 600 phr, especially between 300 and 500 phr; below the indicated minimum values, the second elastomer layer runs the risk of having too high a rigidity for certain applications, whereas above the recommended maximum there is a risk of the second elastomer layer having insufficient cohesion.

For the first elastomer layer and second elastomer layer above, any extender oil may be used, preferably one having a weakly polar character, capable of extending or plasticizing elastomers, especially thermoplastic elastomers. At ambient temperature (23° C.), these oils, which are relatively viscous, are liquids (i.e. as a reminder, substances having the capability of eventually taking the form of their container), as opposed especially to resins or rubbers which are by nature solids.

Preferably, the extender oil of the first elastomer and the extender oil of the second elastomer, which are identical or different, are chosen from the group consisting of polyolefin oils (i.e. those resulting from the polymerization of olefins, monoolefins or diolefins), paraffinic oils, naphthenic oils (of low or high viscosity), aromatic oils, mineral oils and mixtures of these oils.

More preferably, the extender oil of the first elastomer and the extender oil of the second elastomer, which are identical or different, are chosen from the group consisting of polybutene oils, paraffinic oils and mixtures of these oils.

It should be noted in particular, that the addition of an extender oil to the first elastomer leads to a certain loss of impermeability of the first elastomer layer, which varies depending on the type and amount of oil used. Preferably, a polybutene oil, in particular a polyisobutylene (PIB) oil, is used for the first layer. Such polybutene oils have demonstrated the best compromise of airtightness properties compared with the other oils tested, especially compared with paraffinic oils.

Examples of polyisobutylene oils include those sold in particular by Univar under the trade names "Dynapak Poly" (e.g. "Dynapak Poly 190"), by BASF under the trade names "Glissopal" (e.g. "Glissopal 1000") or "Oppanol" (e.g. "Oppanol B12"); paraffinic oils are sold for example by Exxon under the trade name "Telura 618" or by Repsol under the trade name "Extensol 51".

The number-average molecular weight ($M_n$) of the extender oil is preferably between 200 and 30 000 g/mol, more preferably still between 300 and 10 000 g/mol. For excessively low $M_n$ values, there is a risk of the oil migrating to the outside of the composition, whereas excessively high $M_n$ values may result in this composition becoming too stiff. An $M_n$ value between 350 and 4000 g/mol, in particular between 400 and 3000 g/mol, proves to be an excellent compromise for the intended applications, in particular for use in a pneumatic tire.

The number-average molecular weight ($M_n$) of the extender oil is determined by SEC, the specimen being firstly dissolved in tetrahydrofuran with a concentration of about 1 g/l and then the solution is filtered on a filter of 0.45 μm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the trade name "STYRAGEL HT6E" is used. The injected volume of the polymer specimen solution is 100 μl. The detector is a WATERS 2410 differential refractometer and its associated software for handling the chromatograph data is the WATERS MILLENNIUM system. The calculated average molecular weights are relative to a calibration curve obtained with polystyrene standards.

A person skilled in the art will know, in the light of the description and the exemplary embodiments that follow, how to adjust the quantity of extender oil according to the particular usage conditions of the multilayer laminate of the invention, in particular of the inflatable article in which it is intended to be used.

I-1-C. Various Additives

The first elastomer layer and the second elastomer layer described previously may furthermore comprise the various additives usually present in the airtight layers or the self-sealing layers known to a person skilled in the art. Mention will be made, for example, of reinforcing fillers such as carbon black or silica, non-reinforcing or inert fillers, colorants that can advantageously be used for colouring the compositions, platy fillers that further improve the impermeability (e.g. phyllosilicates such as kaolin, talc, mica, graphite, clays or modified clays ("organo clays")), plasticizing agents other than the aforementioned extender oils, stabilizers such as antioxidants or antiozonants, UV stabilizers, various processing aids or other stabilizers, or else promoters capable of promoting adhesion to the rest of the structure of the inflatable article.

Besides the elastomers described previously (first elastomer, second elastomer and optional additional elastomers), the first elastomer layer and the second elastomer layer could also comprise, in a preferably minority weight fraction relative to the main elastomer (first or second elastomer, respectively), polymers other than elastomers, such as for example thermoplastic polymers compatible with said first and second elastomers.

The first and second layers described previously are compounds that are solid (at 23° C.) and elastic, which are especially characterized, thanks to their specific formulation, by a very high flexibility and very high deformability.

According to one preferred embodiment of the invention, especially during use in a pneumatic tire, the gastight first layer or composition has a secant extension modulus, at 10% elongation (denoted by M10), which is less than 2 MPa, more preferably less than 1.5 MPa (especially less than 1 MPa). According to another preferred embodiment, especially during use in a pneumatic tire, the second elastomer layer (self-sealing composition) has an elongation at break greater than 500%, especially greater than 800%, and a tensile strength of greater than 0.2 MPa. The above mechanical properties are measured at first elongation (that is to say without an accommodation cycle) at a temperature of 23° C., with a pull rate of 500 mm/min (ASTM D412 standard), and normalized to the initial cross section of the test specimen.

I-2. Use of the Laminate of the Invention in a Pneumatic Tire

The laminate described previously can be used in any type of inflatable article; it is particularly well suited to an inflatable article (a finished or semi-finished product) made of rubber, most particularly in a pneumatic tire for a motor vehicle such as a two-wheeled, passenger or industrial vehicle.

Such a laminate is preferably placed on the inner wall of the inflatable article, but it may also be completely integrated into its internal structure.

The airtight first elastomer layer (or elastomer layer that is impermeable to any other inflation gas, for example nitrogen) has a thickness preferably greater than 0.05 mm, more preferably between 0.1 mm and 10 mm (for example between 0.1 and 1.0 mm). The self-sealing second elastomer layer has a thickness preferably greater than 0.3 mm, more preferably between 0.5 mm and 10 mm (for example between 1 and 5 mm).

It will be readily understood that, depending on the specific fields of application and on the dimensions and pressures involved, the method of implementing the invention may vary, the airtight first layer, like the self-sealing second layer, in fact having several preferential thickness ranges. Thus, for example, in the case of passenger vehicle tires, it may have a thickness of at least 0.4 mm, preferably between 0.6 and 2 mm. According to another example, in the case of heavy or agricultural vehicle tires, the preferred thickness may be between 1 and 3 mm. According to another example, in the case of tires for vehicles in the civil engineering field or for aircraft, the preferred thickness may be between 2 and 10 mm.

Compared to the airtight and self-sealing laminates based on butyl rubber, the laminate according to the invention has the advantage of exhibiting, over a very wide range of pneumatic tire operating temperatures, a substantially reduced hysteresis, and therefore of giving the pneumatic tires a reduced rolling resistance, as is demonstrated in the following exemplary embodiments.

II. Exemplary Embodiment of the Invention

The multilayer laminate of the invention can be advantageously used in tires of all types, particularly tires for passenger vehicles or industrial vehicles, such as heavy vehicles.

As an example, the single appended FIGURE shows very schematically (not drawn to scale) a radial cross section of a pneumatic tire incorporating a laminate according to the invention.

This pneumatic tire 1 has a crown 2 reinforced by a crown reinforcement or belt 6, two sidewalls 3 and two beads 4, each of these beads 4 being reinforced with a bead wire 5. The crown 2 is surmounted by a tread (not shown in this schematic FIGURE). A carcass reinforcement 7 is wound around the two bead wires 5 in each bead 4, the upturn 8 of this reinforcement 7 lying for example towards the outside of the pneumatic tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the circumferential mid-plane (the plane perpendicular to the rotation axis of the pneumatic tire, which is located at mid-distance of the two beads 4 and passes through the middle of the crown reinforcement 6).

The pneumatic tire 1 is characterized in that its inner wall includes a multilayer laminate (10) according to the invention, comprising at least two layers (10a, 10b), said laminate being airtight thanks to its airtight first elastomer layer (10a) and self-sealing thanks to its self-sealing second elastomer layer (10b). In accordance with a preferred embodiment of the invention, the laminate covers substantially the entire inner wall of the pneumatic tire, extending from one sidewall to the other, at least as far as the rim flange when the pneumatic tire is in the fitted position.

According to one preferred embodiment, the laminate is placed in such a way that the self-sealing second layer (10b) is radially innermost in the pneumatic tire relative to the first layer (10a) then placed between the second layer and the rest of the structure of the pneumatic tire 1 as shown schematically in the appended FIGURE. Another possible embodiment is that in which the airtight first layer (10a) is radially innermost.

Unlike a conventional pneumatic tire that uses a single airtight layer based on butyl rubber, the pneumatic tire according to the invention uses, in this example, firstly as the airtight first elastomer layer (10a) (thickness 0.8 mm) an SIBS elastomer ("Sibstar 102T" with a styrene content of around 15%, a $T_g$ of around −65° C. and an $M_n$ of around 90 000 g/mol) extended with around 55 phr of PIB oil ("Dynapak Poly 190"—$M_n$ of around 1000 g/mol).

This first layer (10a) is also intended in the pneumatic tire of the invention to protect the carcass reinforcement from diffusion of air coming from the internal space of the pneumatic tire. This airtight first layer 10a therefore enables the pneumatic tire 1 to be inflated and kept under pressure. Its airtightness properties enable it to guarantee a relatively low rate of pressure loss, making it possible to keep the pneumatic tire inflated, in the normal operating state, for a sufficient time, normally several weeks or several months.

The second elastomer layer (10b) (with a thickness of about 2 mm) itself consists of the "Mediprene 500000M" product described above, the two essential constituents of which are an SEBS elastomer (with a styrene content of about 30%, a $T_g$ close to −60° C. and an $M_n$ value of around 300 000 g/mol) and a paraffinic extender oil ($M_n$ of around 600 g/mol) with a weight content of about 400 phr.

This layer 10b, therefore placed between the layer 10a and the cavity 11 of the pneumatic tire, provides the pneumatic tire with effective protection against pressure losses due to accidental perforations, by enabling these perforations to be automatically sealed.

If a foreign body such as a nail passes through the structure of the inflatable article, for example a wall such as a sidewall 3 or the crown 6 of the pneumatic tire 1, the composition serving as self-sealing layer is subjected to several stresses. In reaction to these stresses, and thanks to its advantageous deformability and elasticity properties, said composition creates a sealed contact region around the entire body. It matters little whether the outline or profile of said body is uniform or regular, the flexibility of the self-sealing composition enabling it to penetrate into minimal openings. This interaction between the self-sealing composition and the foreign body seals up the region affected by the latter.

In the event of the foreign body being removed, whether accidentally or intentionally, a perforation remains, which can generate a relatively substantial leak, depending on its size. The self-sealing composition, exposed to the hydrostatic pressure, is sufficiently flexible and deformable to close up, by deforming, the perforation, preventing the inflation gas from leaking out. Especially in the case of a pneumatic tire, it has turned out that the flexibility of the multilayer laminate of the invention can withstand without any problem the forces from the surrounding walls, even during deformation phases of the loaded pneumatic tire and when the latter is running.

The pneumatic tire provided with its laminate (10) as described above and that defines the radially internal face of said pneumatic tire may be produced before or after vulcanization (or curing).

In the first case (i.e. before the pneumatic tire is vulcanized), the laminate is simply applied in a conventional manner at the desired place, so as to form the superposed layers 10a and 10b. The vulcanization is then carried out conventionally. The TPS elastomers are well able to withstand the stresses associated with the vulcanization step. An advantageous manufacturing variant, for a person skilled in the art of tires, would consist for example during a first step in laying down the laminate of the invention flat, directly on a building drum, in the form of a two-layer laminate with a suitable thickness (for example 3 mm), before this is covered with the rest of the structure of the pneumatic tire, according to the manufacturing techniques well known to a person skilled in the art.

In the second case (i.e. after vulcanization of the pneumatic tire), the laminate is applied to the inside of the cured pneumatic tire, by any appropriate means, for example by bonding, by spraying or by extrusion and blow moulding two films of suitable thickness.

In the following examples, the airtightness properties were first analysed on test specimens of gastight layers based, on the one hand, on butyl rubber and on the other hand, on the first elastomer (polystyrene/polyisobutylene copolymer thermoplastic elastomer—in the present case SIBS "Sibstar 102T" with and without extender oil).

For this analysis, a rigid-wall permeameter was used, placed in an oven (temperature of 60° C. in the present case), equipped with a pressure sensor (calibrated in the range of 0 to 6 bar) and connected to a tube equipped with an inflation valve. The permeameter may receive standard test specimens in disk form (for example having a diameter of 65 mm in the present case) and with a uniform thickness which may range up to 3 mm (0.5 mm in the present case). The pressure sensor is connected to a National Instruments data acquisition card (0-10 V analogue four-channel acquisition) which is connected to a computer that carries out a continuous acquisition with a frequency of 0.5 Hz (1 point every two seconds). The permeability coefficient (K) is measured from the linear regression line (average over 1000 points) giving, as a function of time, the slope a of the pressure loss through the specimen tested, after stabilization of the system, that is to say after obtaining a steady state during which the pressure decreases linearly as a function of time.

Firstly, the first elastomer (SIBS) used alone, that is to say without extender oil or other additive, turned out to have, at equal thickness, a very low permeability coefficient, equal to that of the usual composition based on butyl rubber. Its modulus M10 is itself nearly 40% less than that of the control composition based on butyl rubber (1.4 MPa compared to 2.3 MPa). This already constitutes a remarkable result for such a material.

As already indicated, if a certain loss of impermeability is accepted in the compensation, the addition of an extender oil to the first elastomer advantageously makes it possible to facilitate the integration of the laminate into the inflatable article, via a reduction of the modulus and an increase of the tackifying power of the gastight first elastomer layer. Thus, by using for example 45 and 65 phr of extender oil, it was observed that the permeability coefficient was increased (and therefore the impermeability reduced) by more than a factor of two (2.2 and 3.4 times, respectively) in the presence of a paraffinic oil, by a factor of less than two (1.5 and 1.6 times, respectively) in the presence of PIB oil ("Dynapak Poly 190").

It is for this reason that the combination of SIBS and of PIB oil has proved to offer the best compromise of properties as regards the gastight first layer. For the airtight composition based on SIM and PIB, it was furthermore observed that the modulus M10 was further decreased, reduced to a value of less than 1 MPa.

Following the above laboratory tests, pneumatic tires according to the invention, of the passenger vehicle type (dimension 205/55 R16), were manufactured; their inner wall was covered (over a building drum, before manufacture of the rest of the tire) with an airtight and puncture-resistant laminate (10) having a total thickness of around 2.8 mm, then the tires were vulcanized. The airtight first layer (10a) was formed from SIBS extended with 55 phr of PIB oil, as described above.

These pneumatic tires according to the invention were compared with control pneumatic tires (Michelin "Energy 3" brand), the inner wall of which comprised a single conventional airtight layer, based on butyl rubber, of the same thickness as the preceding gastight first layer (0.8 mm).

Firstly, the rolling resistance of the pneumatic tires was measured on a fly wheel according to the ISO 87-67 (1992) method.

It was then observed that the pneumatic tires of the invention had a rolling resistance that was reduced very significantly and unexpectedly for a person skilled in the art, by almost 4% relative to the control pneumatic tires, despite the presence of an additional self-sealing layer in the pneumatic tire of the invention.

Next, on the fitted and inflated pneumatic tires, five perforations having a diameter of 6 mm and two perforations having a diameter of 1 mm were made through the tread and the crown block on the one hand, and through the side walls on the other hand, using punches that were immediately removed.

The control pneumatic tire, which only comprised the gastight layer based on butyl rubber, lost its pressure in less than one minute, becoming totally unsuitable for running.

Unexpectedly, the pneumatic tire of the invention itself withstood being run on a fly wheel rolling test at 130 km/h, with a nominal load of 400 kg, without loss of pressure for more than 6300 km, after which distance the rolling test was stopped. On another pneumatic tire according to the invention, the same procedure was carried out this time leaving the puncturing objects in place for one week. The same excellent result was obtained.

In conclusion, the invention offers the designers of pneumatic tires the opportunity of substantially reducing the hysteresis of the gastight and self-sealing multilayer laminates, and therefore of substantially reducing the fuel consumption of motor vehicles fitted with such tires, while giving these tires excellent airtightness and puncture-resistant properties.

The invention claimed is:

1. A puncture-resistant multilayer laminate that is impermeable to inflation gases, usable in an inflatable article, comprising:
    a gastight first elastomer layer comprising a thermoplastic elastomer copolymer with polystyrene and polyisobutylene blocks (hereinafter "first elastomer"), and optionally an extender oil with a content within a range of 0 to less than 100 phr
    wherein said first elastomer represents more than 70% by weight of all elastomers present in said gastight first elastomer layer; and
    a self-sealing second elastomer layer comprising a thermoplastic styrene elastomer (hereinbelow "second elastomer"), identical to or different from the first elastomer, and an extender oil with a content greater than 200 phr
    wherein said second elastomer represents more than 70% by weight of all elastomers present in said self-sealing second elastomer layer.

2. The laminate according to claim 1, wherein the first elastomer is a styrene/isobutylene/styrene (SIBS) copolymer.

3. The laminate according to claim 1, wherein the first elastomer is, in the first elastomer layer, the sole elastomer or the predominant elastomer by weight.

4. The laminate according to claim 1, wherein the second elastomer is chosen from the group consisting of styrene/butadiene/styrene block copolymers, styrene/isoprene/styrene block copolymers, styrene/isobutylene/styrene block copolymers, styrene/isoprene/butadiene/styrene block copolymers, styrene/ethylene-butylene/styrene block copolymers, styrene/ethylene-propylene/styrene block copolymers, styrene/ethylene-ethylene-propylene/styrene block copolymers and mixtures of these copolymers.

5. The laminate according to claim 4, wherein the second elastomer is chosen from the group consisting of styrene/ethylene-butylene/styrene block copolymers, styrene/ethylene-propylene/styrene block copolymers, and mixtures of these copolymers.

6. The laminate according to claim 1, wherein the second elastomer is, in the second elastomer layer, the sole elastomer or the predominant elastomer by weight.

7. The laminate according to claim 1, wherein the first elastomer and the second elastomer each comprise between 5 and 50% by weight of styrene.

8. The laminate according to claim 1, wherein the first elastomer and the second elastomer each have a glass transition temperature ($T_g$) which is below −20° C.

9. The laminate according to claim 1, wherein the number-average molecular weight ($M_n$) of the first elastomer is between 30 000 and 500 000 g/mol.

10. The laminate according to claim 1, wherein the number-average molecular weight ($M_n$) of the second elastomer is between 50 000 and 500 000 g/mol.

11. The laminate according to claim 1, wherein the extender oil of the first elastomer and the extender oil of the second elastomer, which are identical or different, are chosen from the group consisting of polyolefin oils, paraffinic oils, naphthenic oils, aromatic oils, mineral oils and mixtures of these oils.

12. The laminate according to claim 11, wherein the extender oil of the first elastomer and the extender oil of the second elastomer, which are identical or different, are chosen from the group consisting of polybutene oils, paraffinic oils and mixtures of these oils.

13. The laminate according to claim 12, wherein the extender oil of the first elastomer and the extender oil of the second elastomer, which are identical or different, are polyisobutylene oils.

14. The laminate according to claim 1, wherein the number-average molecular weight ($M_n$) of the extender oil of the first elastomer and the molecular weight ($M_n$) of the extender oil of the second elastomer are each between 200 and 30 000 g/mol.

15. The laminate according to claim 1, wherein the extender oil content of the first elastomer is between 5 and 100 phr.

16. The laminate according to claim 1, wherein the extender oil content of the second elastomer is between 200 and 700 phr.

17. The laminate according to claim 1, wherein the first elastomer layer has a thickness of greater than 0.05 mm.

18. The laminate according to claim 1, wherein the second elastomer layer has a thickness of greater than 0.3 mm.

19. An inflatable article comprising a laminate according to claim 1.

20. An inflatable article according to claim 19, said article being a rubber article.

21. An inflatable article according to claim 20, said inflatable article being a pneumatic tire.

22. An inflatable article according to claim 20, said inflatable article being an inner tube.

23. The laminate according to claim 17, wherein the first elastomer layer has a thickness between 0.1 mm and 10 mm.

24. The laminate according to claim 18, wherein the second elastomer layer has a thickness between 0.5 mm and 10 mm.

* * * * *